United States Patent
Lee

(10) Patent No.: US 6,546,049 B1
(45) Date of Patent: Apr. 8, 2003

(54) PARAMETERIZED QUANTIZATION MATRIX ADAPTATION FOR VIDEO ENCODING

(75) Inventor: Jung Woo Lee, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/406,352

(22) Filed: Sep. 28, 1999

Related U.S. Application Data

(60) Provisional application No. 60/103,119, filed on Oct. 5, 1998.

(51) Int. Cl.[7] .......................... H04N 7/12; H04N 11/02; H04N 11/04
(52) U.S. Cl. .......................... 375/240.03; 375/240.05; 375/240.04; 375/240.22
(58) Field of Search .......................... 375/240.3, 240.4, 375/240.5, 240.22

(56) References Cited

U.S. PATENT DOCUMENTS

| | | |
|---|---|---|
| 5,444,800 A | 8/1995 | Kim |
| 5,717,465 A | 2/1998 | Kim |
| 5,734,737 A | 3/1998 | Chang et al. |
| 5,818,531 A | * 10/1998 | Yamaguchi et al. ........ 348/403 |

* cited by examiner

*Primary Examiner*—Chris Kelley
*Assistant Examiner*—Charles Parsons
(74) *Attorney, Agent, or Firm*—William J. Burke

(57) ABSTRACT

In video compression processing, such as MPEG-2 compression processing, the quantization (Q) matrix used to quantize discrete cosine transform (DCT) coefficients is updated from frame to frame based on a parameterized Q matrix adaptation algorithm. According to the algorithm, the Q matrix for the current frame is generated based on DCT coefficient data from the previously encoded frame of the same type (e.g., I, P, or B) as the current frame. In particular, the Q matrix is generated using a function based on shape parameters (e.g., the slope of the diagonal of the Q matrix and/or the convexity of the diagonal of the Q matrix), where the diagonal slope for the Q matrix of the current frame is generated based on the diagonal slope of a DCT map for the previously encoded frame. Before using the generated Q matrix to quantize the DCT coefficients for the current frame, the Q matrix is preferably adjusted for changes in the target mean from the previously encoded frame to the current frame.

20 Claims, 2 Drawing Sheets ated adaptation algorithm for updating the quantization matrix used during video compression, such as MPEG-2 compression. In a preferred embodiment, the parameterized Q matrix adaptation algorithm of the present invention is a real-time vision-optimized encoding (VOE) algorithm that does not require on-line computation of a visual discrimination model (VDM). The VOE element of this algorithm is that, in addition to other parameters of the algorithm, the functional relationship between the DCT statistics and the matrix parameterization is optimized based on the VDM, which can be any perceptual quality metric, using an exhaustive search.

PARAMETERIZED QUANTIZATION MATRIX ADAPTATION FOR VIDEO ENCODING

CROSS-REFERENCE TO RELATED APPLICATIONS

This application claims the benefit of the filing date of U.S. provisional application no. 60/103,119, filed on Oct. 5, 1998.

This invention was made with United States Government support under Contract No. 70NANB5H1178 awarded by the National Institute of Standards and Technology. The United States Government has certain rights in the invention.

BACKGROUND OF THE INVENTION

1. Field of the Invention

The present invention relates to video compression and decompression algorithms.

2. Description of the Related Art

In a typical transform-based video compression algorithm, such as one conforming to the Moving Picture Experts Group (MPEG) family of algorithms, a block-based transform, such as a discrete cosine transform (DCT), is applied to blocks of image data corresponding either to pixel values or pixel differences generated, for example, based on a motion-compensated inter-frame differencing scheme. The resulting transform coefficients for each block are then typically quantized for subsequent encoding (e.g., run-length encoding followed by variable-length encoding) to generate an encoded video bitstream.

Depending on the particular video compression algorithm, images may be designated as the following different types of frames for compression processing:

An intra (I) frame which is encoded using only intra-frame compression techniques, A predicted (P) frame which is encoded using inter-frame compression techniques based on a reference frame corresponding to a previous I or P frame, and which can itself be used to generate a reference frame for encoding one or more other frames, and A bi-directional (B) frame which is encoded using inter-frame compression techniques based on either (i) forward, (ii) reverse, or (iii) bi-directional prediction from either (i) a previous I or P frame, (ii) a subsequent I or P frame, or (iii) a combination of both, respectively, and which cannot itself be used to encode another frame. Note that, in P and B frames, one or more blocks of image data may be encoded using intra-frame compression techniques.

In MPEG-2 encoding, an (8×8) quantization (Q) matrix can be defined (and updated) for each video frame, where each element in the Q matrix corresponds to a different corresponding DCT coefficient resulting from applying an (8×8) DCT transform to a block of pixel values or pixel differences. For a given frame, the elements in the defined Q matrix are scaled by a quantization parameter (mquant), which can vary from block to block within the frame, to generate quantizer values used to quantize the different blocks of DCT coefficients for that frame.

SUMMARY OF THE INVENTION

The present invention is directed to a parameterized adaptation algorithm for updating the quantization matrix According to embodiments of the present invention, the Q matrix is adapted based on the DCT statistics of the previously encoded frame of the same picture type. The DCT statistics are based on the slope of the main diagonal of the DCT map, which is averaged over a frame. The slope of the parameterized Q matrix is roughly inversely proportional to the slope of the main diagonal of the DCT map. The parameterization of the Q matrix may consist of three parameters: the slope of the matrix along the diagonal, the convexity of the matrix along the diagonal, and a specified constant offset. In one implementation of the present invention, the slope is updated for each frame type (i.e., I, P, and B frames), and the convexity is fixed to a constant. Another aspect of the algorithm is the mean adjustment of the matrix. Whenever the slope of a matrix changes (i.e., from frame to frame), the effective mean of the matrix should be changed, where the effective mean is preferably kept constant for a given frame.

According to one embodiment, the present invention is a method for processing a current frame of video data, comprising the steps of (a) generating a transform map for a previously encoded frame of video data of the same type as the current frame; (b) generating one or more quantization (Q) matrix shape parameters using the transform map for the previously encoded frame; (c) generating a Q matrix for the current frame using a parameterized function based on the one or more Q matrix shape parameters; (d) quantizing transform coefficients corresponding to the current frame based on the Q matrix; and (e) generating part of an encoded video bitstream based on the quantized transform coefficients.

BRIEF DESCRIPTION OF THE DRAWINGS

Other aspects, features, and advantages of the present invention will become more fully apparent from the following detailed description, the appended claims, and the accompanying drawings in which

DETAILED DESCRIPTION

Figure 1:
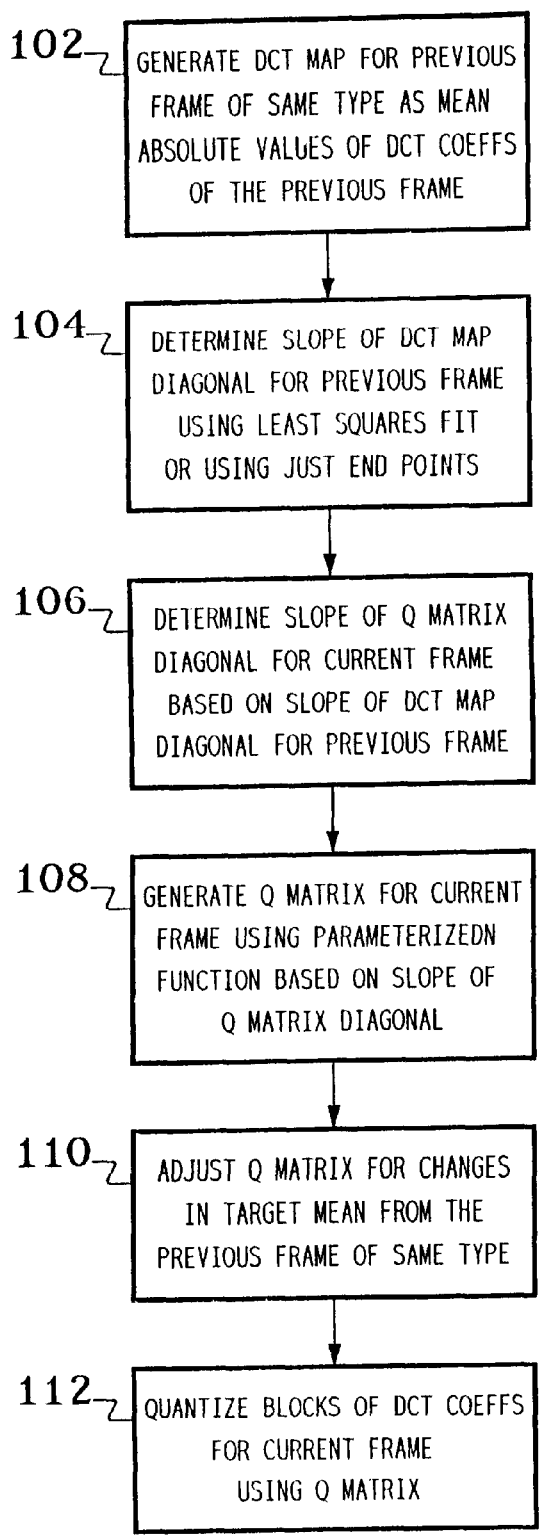
FIG. 1 shows a flow diagram of processing for a current frame of video data, according to one embodiment of the present invention.

The present invention comprises two parts: (1) the shape adaptation of the quantization matrix and (2) the mean adjustment of the Q matrix. In the first part, the shape (e.g., diagonal slope and convexity) of a Q matrix is determined from the DCT map statistics of the previously encoded frame of the same type. The second part deals with the mean adjustment of the Q matrix after the matrix is updated by the first part of the algorithm. The actual bit rate for each frame is affected by the change in the shape of a matrix. This change is compensated by the mean adjustment algorithm in order to maintain relatively constant bit rate.

Q Matrix Shape Adaptation

Since there are 64 elements in an (8×8) Q matrix and since each 8-bit element can have one of 256 different values, there are $256^{64}$ different possible Q matrices. In order to reduce the search complexity, the present invention uses a parameterized approach to limit the search to a relatively small number of classes of matrices. In one embodiment, this parameterized approach relies on three parameters: the slope of the Q matrix along the diagonal, the convexity of the Q matrix along the diagonal, and a specified constant offset.

One possible parameterization is based on a sinusoidal function, as represented in Equation (1) as follows:

$$q[i][j]=a*(r-ctr)+b*(\sin(4*pi/end)-2/pi)+c \qquad (1)$$

where:
- q[i][j] is the element at row i and column j of the Q matrix, wherein i,j=0, . . . ,7;
- a is the slope of Q matrix diagonal;
- ctr is a constant equal to 7/sqrt(2);
- b is the convexity of the Q matrix diagonal;
- end is a constant equal to 7*sqrt(2); and
- c is the specified constant offset.

Another possible parameterization is based on rational functions, as represented by Equation (2) as follows:

$$q[i][j]=(a/\text{sqrt}(2)*(i+j+7))+b*\text{diagconvex}(i,j)+d*\text{crossconvex}(i,j) \qquad (2)$$

where:
- diagconvex is a function that determines the convexity along the diagonal direction;
- crossconvex is a function for the convexity along the cross-diagonal direction; and
- d is the convexity along the cross diagonal.

In one implementation, when i−j≧0, the diagonal convexity function is given according to Equation (3) as follows:

$$\text{diagconvex}(i,j)=20/7*(7-i)*j/(7-i+j) \qquad (3)$$

and, when i−j<0, the diagonal convexity function is given according to Equation (4) as follows:

$$\text{diagconvex}(i,j)=20/7*i*(7-j)/(7+i-j) \qquad (4)$$

Similarly, in one implementation, when i+j<8, the cross-diagonal convexity function is given according to Equation (5) as follows:

$$\text{crossconvex}(i,j)=20/7*i*j/(i+j) \qquad (5)$$

and, when i+j≧8, the cross-diagonal convexity function is given according to Equation (6) as follows:

$$\text{crossconvex}(i,j)=20/7*(i-7)*(j-7)/(14-(i+j)) \qquad (6)$$

In alternative implementations, the diagonal convexity function (diagconvex) and the cross-diagonal convexity function (crossconvex) can be other suitable adjustable convex functions.

The choice between the first parameterization of Equation (1) and the second parameterization of Equation (2) is dependent on the quality metric and the particular video test sequences. Other ways to parameterize a Q matrix are also possible.

The shape of a Q matrix, which is determined by the slope parameter (a), is updated using the DCT map information from the previously encoded frame that has the same picture type as the current frame. In general, the mapping from the DCT slope to the Q matrix slope is a decreasing function. In one implementation, the function for mapping from the DCT map slope (s) to the Q matrix slope (a) is given by Equation (7) as follows:

$$a=0.5+1.5*\exp(-s*\ln 3/3) \qquad (7)$$

This function was obtained from an exhaustive search using a visual discrimination model as the distortion measure while the bit rate is being kept constant. In order to compute the slope (s) of the DCT map, the mean absolute value of the DCT coefficients for a given frame is computed. The slope of the diagonal for the mean DCT map is then computed, e.g., either by a least squares fit for all of the diagonal elements or just the two end points. Note that the DCT map slope is computed from the DCT data of the previously encoded frame that has the same picture type as the current frame.

Q Matrix Mean Adjustment

When the bit budget is tight, spatial distortion (mostly caused by blockiness) is often more objectionable perceptually than frequency-domain distortion. This indicates that it is better to increase the Q matrix than the quantization scale (mquant), when the bit budget is scarce. It is generally true that the average quantization scale increases when the coding difficulty is higher, which means that the bit budget may not be high enough to guarantee the expected picture quality.

According to embodiments of the present invention, after performing the previously described shape adaptation, the mean of a Q matrix is adjusted to a target mean. The target mean is also updated frame by frame in order to adapt to the varying coding difficulty. The coding difficulty may be estimated as the product of the average mquant (M) and the target mean (C). In one possible implementation, the formula for adjusting the mean of the Q matrix is given by Equation (8) as follows:

$$Cnew=r*(Mold*Cold)/(Mref*Cref)*(Cref+(1-r)*Cref \qquad (8)$$

where:
- Cnew is the adjusted target mean for the current frame;
- r is a specified sensitivity parameter (e.g., 0.5);
- Mold is the average mquant for the previously encoded frame of the same type;
- Cold is the target mean for the previously encoded frame of the same type;
- Mref is a specified default mquant for the current frame type; and
- Cref is a specified default target mean for the current frame type.

The three specified parameters (r, Mref, and Cref) can be determined by an exhaustive search for a test sequence using a suitable perceptual quality metric. Note that Equation (8) is applied with three potentially different sets of parameters for the three different frame types (I, P, and B). Typical values for these parameters are as follows:
- For I frames, r=0.5, Mref=15, and Cref=45;
- For P frames, r=0.5, Mref=15, and Cref=45; and
- For B frames, r=0.5, Mref=17, and Cref=41.

Flow Diagram

FIG. 1 shows a flow diagram of processing for a current frame of video data, according to one embodiment of the present invention. Steps 102–108 correspond to the Q matrix shape adaptation part of the present invention, while step 110 corresponds to the Q matrix mean adjustment part.

In particular, in step 102, the DCT map for the previously encoded frame of the same type as the current frame is generated based on the mean absolute values of the DCT coefficients for that previously encoded frame. The slope (s) of the diagonal of the DCT map for the previously encoded frame is then determined in step 104, e.g., using a least squares fit of all of the elements along the diagonal or using just the end points of the diagonal. The slope (a) of the diagonal of the Q matrix for the current frame is then determined in step 106 based on the slope (s) of the diagonal of the DCT map, e.g., using Equation (7). The Q matrix for the current frame is then generated in step 108 based on the slope (a) of the Q matrix diagonal, e.g., using the parameterized function of Equation (1) or (2).

In step 110, the Q matrix for the current frame is then optionally adjusted for changes in the target mean from the previously encoded frame of the same type, e.g., using Equation (8). In either case, in step 112, the Q matrix for the current frame is then used to quantize the DCT coefficients for the current frame as the quantization step of the process of compressing the current frame for encoding into an encoded video bitstream.

Although FIG. 1 suggests that steps 102–104 are implemented during the processing of the current frame, in practice, it may be better (i.e., less memory required) to implement those steps as part of the processing of the previously encoded frame of the same type.

Figure 2:
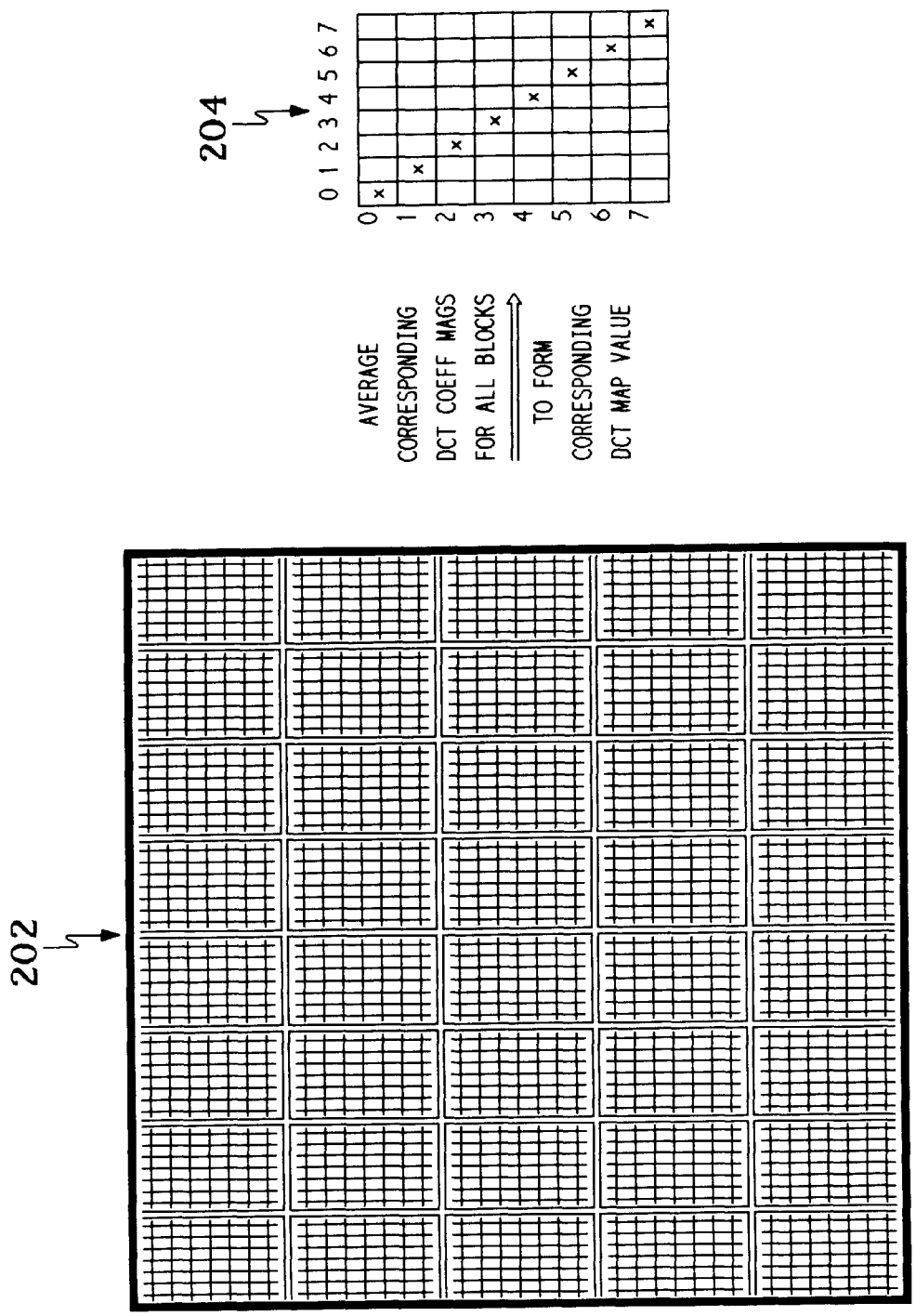
FIG. 2 represents the generation of a DCT map from a set of DCT coefficients corresponding to a previously encoded frame.

FIG. 2 represents the generation of DCT map 204 from a set 202 of 40 (8×8) blocks of DCT coefficients corresponding to a previously encoded frame. For example, the value for element (0,0) of DCT map 204 is determined by averaging the magnitudes of the corresponding (0,0) DCT coefficients from the 40 different blocks, and similarly for the other 63 elements of DCT map 204. The slope (s) of the diagonal of DCT map 204 is determined using some or all of the elements (0,0), (1,1), . . . , (7,7) along the main diagonal of the DCT map.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as sexpressed in the following claims.

What is claimed is:

1. A method for processing a current frame of video data, comprising the steps of:
    (a) generating a transform map for a previously encoded frame of video data of the same type as the current frame;
    (b) generating one or more quantization (Q) matrix shape parameters using the transform map for the previously encoded frame;
    (c) generating a Q matrix for the current frame using a parameterized function based on the one or more Q matrix shape parameters;
    (d) quantizing transform coefficients corresponding to the current frame based on the Q matrix; and
    (e) generating part of an encoded video bitstream based on the quantized transform coefficients.

2. The method of claim 1, wherein the previously encoded frame is the same type of video frame as the current frame.

3. The method of claim 1, wherein the transform map is a DCT map corresponding to mean absolute values of DCT coefficients for the previously encoded frame and the transform coefficients are DCT coefficients for the current frame.

4. The method of claim 1, wherein step (c) further comprises the step of adjusting the Q matrix for changes in target mean from the previously encoded frame to the current frame.

5. The method of claim 4, wherein the Q matrix is adjusted according to:

$$Cnew = r*(Mold*Cold)/(Mref*Cref)*(Cref+(1-r)*Cref$$

wherein:
    Cnew is an adjusted target mean for the current frame;
    r is a specified sensitivity parameter;
    Mold is an average quantization parameter (mquant) for the previously encoded frame;
    Cold is a target mean for the previously encoded frame;
    Mref is a specified default mquant for the current frame type; and
    Cref is a specified default target mean for the current frame type.

6. The method of claim 5, wherein r, Mref, and Cref are different parameters for each different type of frame of video data.

7. The method of claim 1, wherein:
    the one or more shape parameters comprise a diagonal slope of the Q matrix; and
    step (b) comprises the steps of:
        (1) generating a diagonal slope of the transform map; and
        (2) generating the diagonal slope of the Q matrix using a mapping function based on the diagonal slope of the transform map.

8. The method of claim 7, wherein the mapping function is based on an exhaustive search using a visual discrimination model.

9. The method of claim 7, wherein the diagonal slope of the transform map is generated using a least squares fit of elements along a diagonal of the transform map.

10. The method of claim 7, wherein the diagonal slope of the transform map is generated using two elements corresponding to end points along a diagonal of the transform map.

11. The method of claim 7, wherein the mapping function is given by:

$$a = 0.5 + 1.5 * \exp(-s * \ln 3/3)$$

wherein:
    a is the diagonal slope of the Q matrix; and
    s is the diagonal slope of the transform map.

12. The method of claim 1, wherein the parameterized function is a sinusoidal function.

13. The method of claim 12, wherein the sinusoidal function is given by:

$$q[i][j]=a*(r-ctr)+b*(\sin(4*pi/end)-2/pi)+c$$

where:
q[i][j] is an element at row i and column j of the Q matrix, wherein i,j=0, . . . ,7;
a is the diagonal slope of the Q matrix;
ctr is a constant equal to 7/sqrt(2);
b is a diagonal convexity of the Q matrix;
end is a constant equal to 7*sqrt(2); and
c is a specified constant offset.

14. The method of claim 1, wherein the parameterized function is a rational function.

15. The method of claim 14, wherein the rational function is given by:

$$q[i][j]=(a/\text{sqrt}(2)*(i+j+7))+b*\text{diagconvex}(i,j)+d*\text{crossconvex}(i,j)+c$$

where:
q[i][j] is an element at row i and column j of the Q matrix, wherein i,j=0, . . . ,7;
a is the diagonal slope of the Q matrix;
b is a diagonal convexity of the Q matrix;
diagconvex is a diagonal convexity function;
crossconvex is a cross-diagonal convexity function; and
d is a cross-diagonal convexity of the Q matrix.

16. The method of claim 15, wherein:
when i−j≧0, the diagonal convexity function is given by:

$$\text{diagconvex}(i,j)=20/7*(7-i)*j/(7-i+j);$$

when i−j<0, the diagonal convexity function is given by:

$$\text{diagconvex}(i,j)=20/7*i*(7-j)/(7+i-j);$$

when i+j<8, the cross-diagonal convexity function is given by:

$$\text{crossconvex}(i,j)=20/7*i*j/(i+j);$$

and, when i+j>8, the cross-diagonal convexity function is given by:

$$\text{crossconvex}(i,j)=20/7*(i-7)*(j-7)/(14-(i+j)).$$

17. The method of claim 1, wherein:
the previously encoded frame is the same type of video frame as the current frame;
the transform map is a DCT map corresponding to mean absolute values of DCT coefficients for the previously encoded frame and the transform coefficients are DCT coefficients for the current frame;
the one or more shape parameters comprise a diagonal slope of the Q matrix;
step (b) comprises the steps of:
(1) generating a diagonal slope of the transform map; and
(2) generating the diagonal slope of the Q matrix using a mapping function based on the diagonal slope of the transform map, wherein the mapping function is based on an exhaustive search using a visual discrimination model; and
step (c) further comprises the step of adjusting the Q matrix for changes in target mean from the previously encoded frame to the current frame.

18. The method of claim 17, wherein:
the diagonal slope of the transform map is generated either using a least squares fit of elements along a diagonal of the transform map or using two elements corresponding to end points along a diagonal of the transform map;
the mapping function is given by:

$$a=0.5+1.5*\exp(-s*\ln 3/3)$$

wherein:
a is the diagonal slope of the Q matrix; and
s is the diagonal slope of the transform map; and
the Q matrix is adjusted according to:

$$Cnew=r*(Mold*Cold)/(Mref*Cref)*(Cref+(1-r)*Cref$$

wherein:
Cnew is an adjusted target mean for the current frame;
r is a specified sensitivity parameter;
Mold is an average quantization parameter (mquant) for the previously encoded frame;
Cold is a target mean for the previously encoded frame;
Mref is a specified default mquant for the current frame type; and
Cref is a specified default target mean for the current frame type, wherein r, Mref, and Cref are different parameters for each different type of frame of video data.

19. The method of claim 17, wherein the parameterized function is either
(A) a sinusoidal function given by:

$$q[i][j]=a*(r-ctr)+b*(\sin(4*pi/end)-2/pi)+c$$

where:
q[i][j] is an element at row i and column j of the Q matrix, wherein i,j=0, . . . ,7;
a is the diagonal slope of the Q matrix;
ctr is a constant equal to 7/sqrt(2);
b is a diagonal convexity of the Q matrix;
end is a constant equal to 7*sqrt(2); and
c is a specified constant offset; or
(B) a rational function given by:

$$q[i][j]=(a/\text{sqrt}(2)*(i+j+7))+b*\text{diagconvex}(i,j)+d*\text{crossconvex}(i,j)+c$$

where:
q[i][j] is an element at row i and column j of the Q matrix, wherein i,j=0, . . . ,7;
a is the diagonal slope of the Q matrix;
b is a diagonal convexity of the Q matrix;
diagconvex is a diagonal convexity function;
crossconvex is a cross-diagonal convexity function; and
d is a cross-diagonal convexity of the Q matrix, wherein:
when i−j≧0, the diagonal convexity function is given by:

$$\text{diagconvex}(i,j)=20/7*(7-i)*j/(7-i+j);$$

when i−j<0, the diagonal convexity function is given by:

$$\text{diagconvex}(i,j)=20/7*i*(7-j)/(7+i-j);$$

when i+j<8, the cross-diagonal convexity function is given by:

$$\text{crossconvex}(i,j)=20/7*i*j/(i+j);$$

and, when i+j≧8, the cross-diagonal convexity function is given by:

$$\text{crossconvex}(i,j)=20/7*(i-7)*(j-7)/(14-(i+j)).$$

20. A machine-readable medium, having encoded thereon program code, wherein, when the program code is executed by a machine, the machine implements a method for processing a current frame of video data, comprising the steps of:

(a) generating a transform map for a previously encoded frame of video data of the same type as the current frame;

(b) generating one or more quantization (Q) matrix shape parameters using the transform map for the previously encoded frame;

(c) generating a Q matrix for the current frame using a parameterized function based on the one or more Q matrix shape parameters;

(d) quantizing transform coefficients corresponding to the current frame based on the Q matrix; and (e) generating part of an encoded video bitstream based on the quantized transform coefficients.

* * * * *